E. A. & R. F. MEYER.
SYSTEM OF LUBRICATION.
APPLICATION FILED MAR. 1, 1912.
1,090,162.
Patented Mar. 17, 1914.
2 SHEETS—SHEET 1.
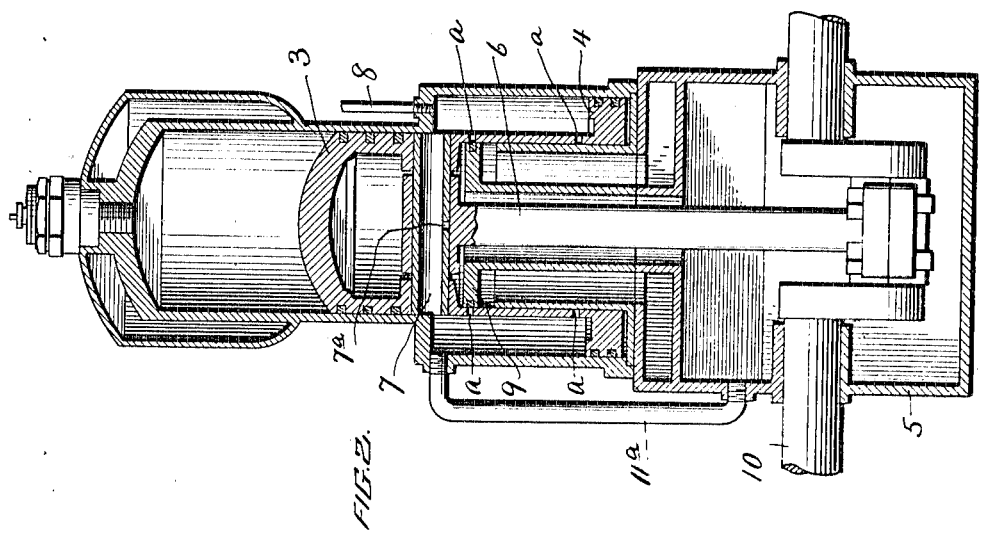
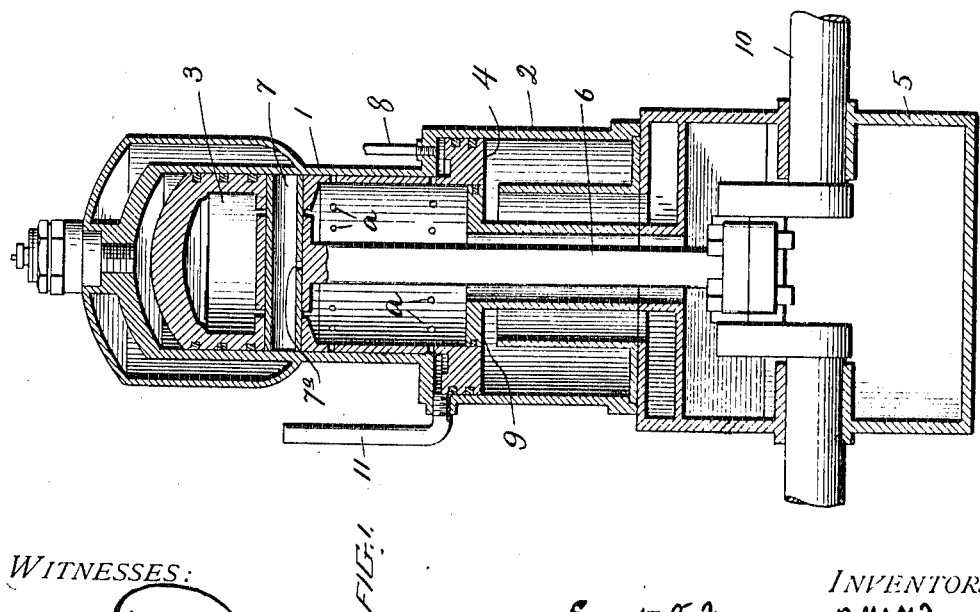
WITNESSES:
INVENTORS
Ernest A. Meyer and Ralph F. Meyer
BY
Attorneys

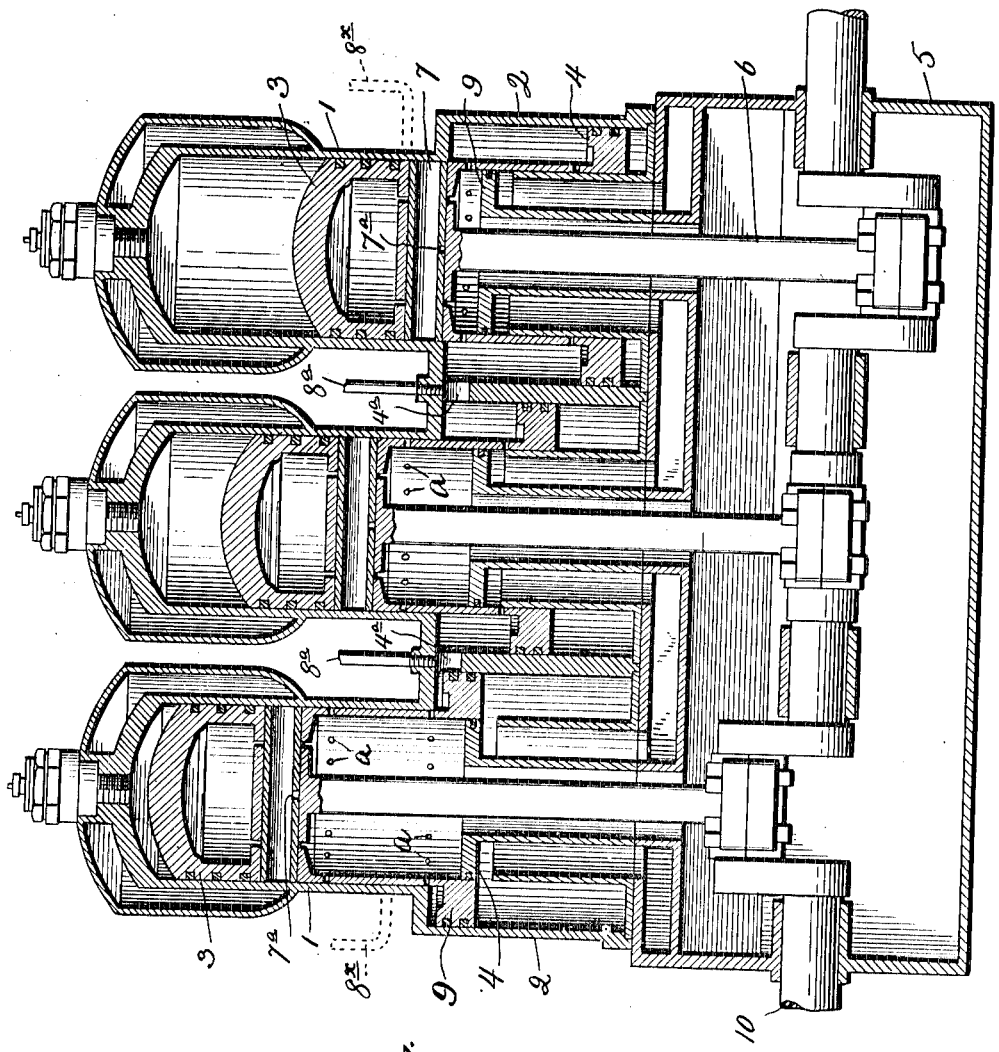

UNITED STATES PATENT OFFICE.

ERNEST A. MEYER AND RALPH F. MEYER, OF FREEPORT, PENNSYLVANIA.

SYSTEM OF LUBRICATION.

1,090,162.   Specification of Letters Patent.   Patented Mar. 17, 1914.

Application filed March 1, 1912. Serial No. 680,873.

*To all whom it may concern:*

Be it known that we, ERNEST A. MEYER and RALPH F. MEYER, citizens of the United States, residing at Freeport, in the county of Armstrong and State of Pennsylvania, have invented certain new and useful Improvements in Systems of Lubrication; and we do hereby declare the following to be a full, clear, and exact description of the invention, such as will enable others skilled in the art to which it appertains to make and use the same.

Our present invention relates to the lubrication of explosive engines and more particularly to a system for the lubrication of the engine shown in the former patent of E. A. Meyer, No. 956,814, granted May 3, 1910 and for engines of like character.

In the accompanying drawing, we have shown our said invention applied to said engine of Meyer and our said invention is disclosed in the following description and claims.

In said drawings, Figure 1 is a vertical sectional elevation of an engine embodying the construction of the said Meyer patent, with our invention applied thereto. Fig. 2 is a like sectional view with the movable parts in a different position, with a slight modification of structure. Fig. 3 is a vertical sectional view of such an engine having a plurality of cylinders cast in one block.

In these drawings, 1 designates the engine cylinder or explosion chamber, 2 designates a larger connected cylinder forming a pump or compression cylinder.

3 designates the engine piston and 4 a piston of larger diameter moving in the pump or compression cylinder, the two pistons being united and forming a compound differential piston.

5 is the crank chamber and 6 the piston rod which is pivotally connected to the interior of the piston 3 by a hollow pin 7 extending through opposite sides of the piston.

8 is a pipe by which the lubricant is supplied to the cylinder 2 above the piston 4. The lubricant is splashed and churned into a mist by the movement of the piston 4, and also by the alternate inrush and outrush of the entrapped air above the head 4. This oil mist and splash lubricate directly the wall of cylinder 2, piston 3, the wall of stationary piston 9 through the holes a, a, and the piston pin bearing through the holes 7ª and 7.

By reference to Fig. 2 which shows the pistons in their lowest position, it will be seen that on each descent of the same the open ends of the hollow pin 7 will be brought so low that the spray of the lubricant in the cylinder 4 will enter the same. This pin is provided midway of its length with an opening 7ª through its underside through which such lubricant as will enter the pin will pass to lubricate the bearing of the piston rod. The engine piston 3 will also descend so far as to cause it to receive an adequate amount of the lubricant.

The body of the piston above the head of the piston 4 is provided with a number of fine openings a, a, a, a, through which the lubricant will ooze through or pass in small quantities to the interior of the body. In the construction shown, this will serve to lubricate the stationary piston 9. The overplus will descend on the inside thereof and drop upon the crank on each side of the piston rod and assist in lubricating the bearing of the crank pin as well as the bearings of the shaft 10 on each side of the crank.

In the patent hereinbefore referred to, the cylinder 2 is provided with a breathing aperture to prevent compression and expansion of air within said cylinder above the piston 4. In applying our system of lubrication to a single cylinder engine of this type, in order to prevent the expulsion or splashing of the lubricant through such an aperture, we provide the tube or pipe 11 which is made to extend to such a height as to prevent all escape of the lubricant and yet provide for the ingress and egress of air above the said piston 4.

In Fig. 2, a pipe 11ª is provided extending from the top of the cylinder 2 downward and connecting with the crank chamber. This passage may also be cast integral with the cylinder. The air will be made to pass in alternate directions through this pipe during the operation of the engine. Some lubricant will in all likelihood pass through this pipe into the crank chamber, but this will assist in the lubrication of the shafts and crank pin, the overplus collecting in the bottom of the chamber.

When our system is applied to an engine in which there are a plurality of cylinders cast in one block, provision is made for this "breathing" or movement of the air by having the space in each cylinder above the piston 4 connected with each adjacent cylinder through passages 4ª. The air will pass from one cylinder to another to effect the like purpose of pipes 11 and 11ª shown in the other figures. The lubricant is in such case preferably admitted through pipes 8ª opening into said passages 4ª. If preferred, however, the lubricant may be introduced through the pipes 8ˣ shown in dotted lines in Fig. 3 of the drawings and a like means may be employed in the construction shown in Figs. 1 and 2. In case a plurality of cylinders separately constructed should be employed, the lubricant would be supplied as indicated in Figs. 1 and 2 and the space in cylinders 2 above the pistons 4 would be connected with each other by pipes extending from one cylinder to another on the outside thereof. This system may be applied to all engines having the two pistons of differing diameters. In case there should be no stationary piston 9, a portion of the lubricant could be allowed to descend into the crank chamber through the holes $a$, $a$, or the holes $a$, $a$ could be closed entirely. In the latter case the crank shaft bearings would necessarily require a separate oil supply.

The system designed by us is simple and provides for the lubrication of the main wearing surfaces of the engine efficiently and economically. It precludes the possibility of dirt or metallic cuttings reaching the piston and cylinder walls.

What we claim and desire to secure by Letters Patent is:—

1. In a gas engine having a compound differential piston, cylinders for said piston, a supply pipe adapted to feed lubricant directly to the cylinder for the larger piston above said piston, forming a splash chamber, the said differential piston being pivoted to the piston rod by a hollow or tubular pin, said differential piston when in its lower position bringing a considerable portion of the smaller part of said piston and the open ends of the hollow pin into said splash chamber, said hollow pin having an opening between its ends through the lower side of the same to lubricate the bearing of the piston and of the piston rod, and a breathing passage for said splash chamber.

2. In a gas engine of the character described, having a compound differential piston working in an appropriate cylinder construction, a lubricant supply pipe communicating directly with the larger cylinder above the larger piston, forming a splash chamber, means for lubricating the smaller piston, the larger cylinder wall and pivot pin of the piston end of the piston rod, said piston body above the larger piston head being perforated to permit of the passage of the lubricant into the interior of the piston body to lubricate the crank pin and the journals of the crank shaft, and a breathing passage for said splash chamber.

3. In a gas engine having a compound differential piston, cylinders for said piston, a supply pipe for lubricant communicating with the cylinder for the larger piston directly above said piston, forming a splash chamber, the said differential piston being pivoted to the piston rod by a tubular pin, said differential piston when at its lower position bringing a considerable portion of the smaller part of said piston and the open ends of the tubular pin into said splash chamber, said tubular pin having an opening between its ends to lubricate the bearing of the piston and of the piston rod, a stationary piston which acts as a bearing for said differential piston, apertures in said differential piston through which the lubricant is adapted to lubricate the stationary piston, and a breathing passage for said chamber.

4. A gas engine having a plurality of pistons of the compound differential type, cylinders for said pistons, lubricant supply pipes admitting lubricant to the larger cylinders above the larger piston heads, forming splash chambers, the said differential pistons being pivoted to the piston rods by tubular pins, said differential pistons when at their lower position bringing a considerable portion of the smaller part of said pistons and the open ends of the tubular pins into said splash chambers, the bodies of the pistons being perforated above the larger piston heads, to permit the passage of the lubricant to the interior thereof, the larger cylinders being connected for the passage of air between them.

In testimony whereof we affix our signatures, in the presence of two witnesses.

ERNEST A. MEYER.
RALPH F. MEYER.

Witnesses:
 HENRY A. SEITZ,
 MYRNA HARRISON.